United States Patent [19]

Kuhlmann

[11] Patent Number: 5,337,883
[45] Date of Patent: Aug. 16, 1994

[54] RAIL FOR CONVEYOR FOR TRANSPORTING GOODS HANGING ON HANGERS

[75] Inventor: Walter Kuhlmann, Lage, Fed. Rep. of Germany

[73] Assignee: Dürkopp Adler AG, Fed. Rep. of Germany

[21] Appl. No.: 25,166

[22] Filed: Mar. 2, 1993

[30] Foreign Application Priority Data

Mar. 7, 1992 [DE] Fed. Rep. of Germany ....... 4207238

[51] Int. Cl.⁵ .............................................. B65G 17/32
[52] U.S. Cl. ................... 198/465.4; 198/687.1; 198/841; 104/172.1
[58] Field of Search ................... 198/465.4, 687.1, 841; 104/172.1, 172.4

[56] References Cited

U.S. PATENT DOCUMENTS

| | | | |
|---|---|---|---|
| 3,164,245 | 1/1965 | Juengel | 198/465.4 |
| 5,078,262 | 1/1992 | Grube et al. | 198/680 |
| 5,082,107 | 1/1992 | Grube et al. | 198/680 |
| 5,113,998 | 5/1992 | Grube et al. | 198/465.4 |

FOREIGN PATENT DOCUMENTS 3909002  7/1990  Fed. Rep. of Germany ... 198/465.4

*Primary Examiner*—Cheryl L. Gastineau
*Attorney, Agent, or Firm*—Ostrolenk, Faber, Gerb & Soffen

[57] ABSTRACT

The invention relates to a rail for accommodating and guiding a conveyor for transporting goods hanging on hangers. The conveyor may be a roller chain which travels and is guided in a chain channel in the rail. The tips of the hanger hooks rest on the roller chain. The chain channel is recessed with respect to the top side of the rail, which faces the hanger hook, and a conical groove extends upward from the roller chain and opens upward toward the outside of the rail. These features make it possible to transport the hanger hooks on their tips. The bevel which is formed by the conical groove, as well as the shape of the rail and the relative positions of the chain channel and the side edge of the rail, ensure that the hanger hook always slides in a well-defined position and orientation on the roller chain regardless of how it has been placed on the conveyor.

5 Claims, 2 Drawing Sheets

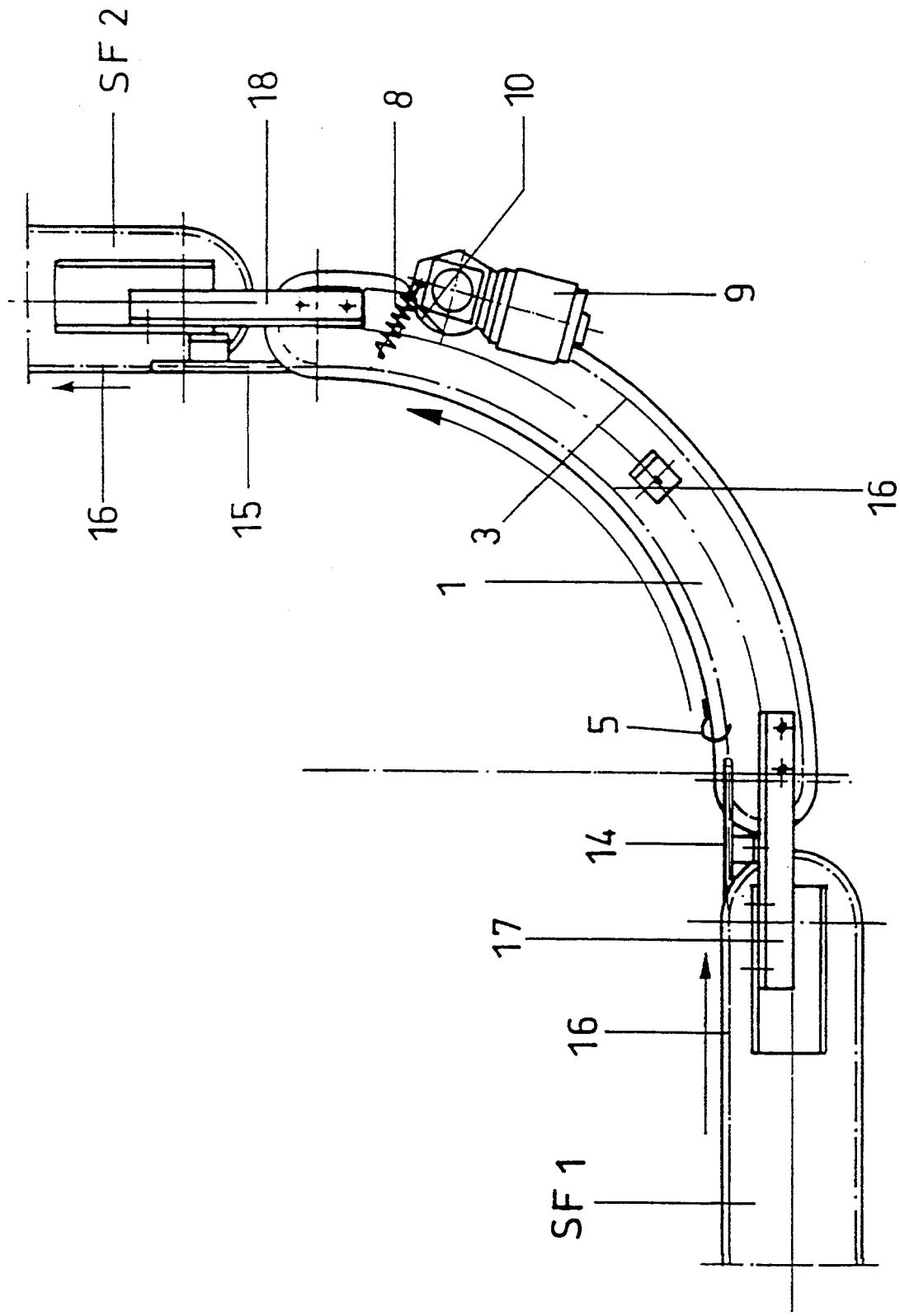

RAIL FOR CONVEYOR FOR TRANSPORTING GOODS HANGING ON HANGERS

BACKGROUND OF THE INVENTION

The present invention relates to a rail for a conveyor for transporting goods hanging on hangers. The conveyor travels, guided, in a channel in the rail with the tips of the hanger hooks supported on the conveyor. The channel is recessed into the surface of the rail that faces the hanger hook, and the channel opens upward toward the exterior of the rail.

Particularly in the clothing industry, conveyors are used in which the goods to be conveyed hang on hangers, which may be ordinary clothes hangers. These hangers are placed onto the conveyor.

German 39 29 158 C2 (U.S. Pat. No. 5,078,262), which exemplifies this type, discloses a conveyor for transporting goods hanging on hangers. In this conveyor, which can be used both as a storage conveyor and as an oblique conveyor, the pulling means circulating in the direction of transport grips the hooks of the hangers at their tips, the tips being spaced laterally from the hangers' center of gravity, in order to transport them. The tip of the hanger hook therefore lies on the pulling means. The advantage of transporting the hanger hook at its tip is that the loading and delivery areas, where the hangers are loaded onto the conveyor and unloaded from the conveyor, can be arranged parallel to the conveyor. In this way, there are no undesired forces or obstructions which interfere with movement of the hangers, such as might exist if the hanger were required to change direction at the loading and delivery areas.

In this prior conveyor, the pulling means is developed as a toothed conveyor belt, which circulates along a path which defines a vertical plane. Therefore, it requires a substantial amount of space in the vertical direction to accommodate the movement of the toothed belt around its sprocket wheels. A conveyor path formed with a toothed belt must be substantially linear, since a toothed belt can be made to follow a curved course only with difficulty, if at all. Further, since the base body which serves as a rail in this prior conveyor performs only a supporting function with respect to the conveyor belt, fluttering of the belt can occur, particularly when the conveyor line is of substantial length, thus producing undesired noise.

German 39 29 156 A1 (U.S. Pat. No. 5,082,107) discloses a hanging conveyor in which the primary pulling means is a horizontally revolving roller chain. This roller chain is guided in a chain channel arranged in a rail. In this case, however, the hanger hook cannot be transported at its tip and the hanger must be hung in a conventional manner on the chain. As a result, with this prior conveyor, linear feeding and delivery, at loading and unloading zones arranged parallel to the conveyor, are not possible. Therefore, this prior conveyor must provide an auxiliary toothed-belt conveyor to assist with delivery of the hangers from the roller chain.

The disclosures of all prior art materials referred to herein are expressly incorporated by reference.

SUMMARY OF THE INVENTION

The object of the present invention therefore is to develop an improved rail for the aforementioned type of conveyor, so that the conveyor can follow a curved path in a horizontal plane, even a path with a small radius; and which will make it possible to transport the hook of the hanger on its tip, quietly and dependably.

This object is achieved by providing a rail for supporting and enclosing a conveyor for transporting goods hanging on hangers. The conveyor is formed by pulling means which travels, guided, in a channel in the rail, with the tips of the hanger hooks supported on the pulling means. The channel is recessed with respect to a surface of the rail which faces the hanger hook, and the channel opens upward toward the exterior of the rail.

The pulling means may be a roller chain, the roller chain being guided directly in and by the rail. The rail may have, adjacent to the channel, i.e., at the vertical level of the channel, a cross-section which is at least approximately trapezoidal. Because of this trapezoidal cross-section, the rail is broader at the top than at the bottom, and therefore, a hanger that is accidentally turned forward or backward will be guided by the side edge 12 into the preferred position, oriented transverse to the rail. Because the rail is not rectangular in cross-section, the sides of the bottom part of the rail are recessed from the sides of the rail, and do not project outward as far as the sides of the top part of the rail. Thus the side edge 12 generally matches the shape of the curved hanger hook, and accordingly does not obstruct any part of the hanger hook.

The channel opens upward into a substantially V-shaped or conically opening groove. The angle of opening ($\alpha$) of the conical groove is preferably about 120°.

As a result of the oblique shape of the chain channel, the hook of a hanger always slides downward along the V-shaped groove into a well-defined position on the roller chain, regardless of how it is placed on the conveyor. Because the roller chain is guided in and by the rail, swinging movements of the pulling means are effectively avoided so that quiet operation is possible.

Other features and advantages of the present invention will become apparent from the following description of the invention which refers to the accompanying drawings.

BRIEF DESCRIPTION OF THE DRAWINGS

FIG. 2 is a diagrammatic view showing a transfer conveyor which includes the rail in accordance with FIG. 1.

DETAILED DESCRIPTION OF AN EMBODIMENT OF THE INVENTION

Figure 1:
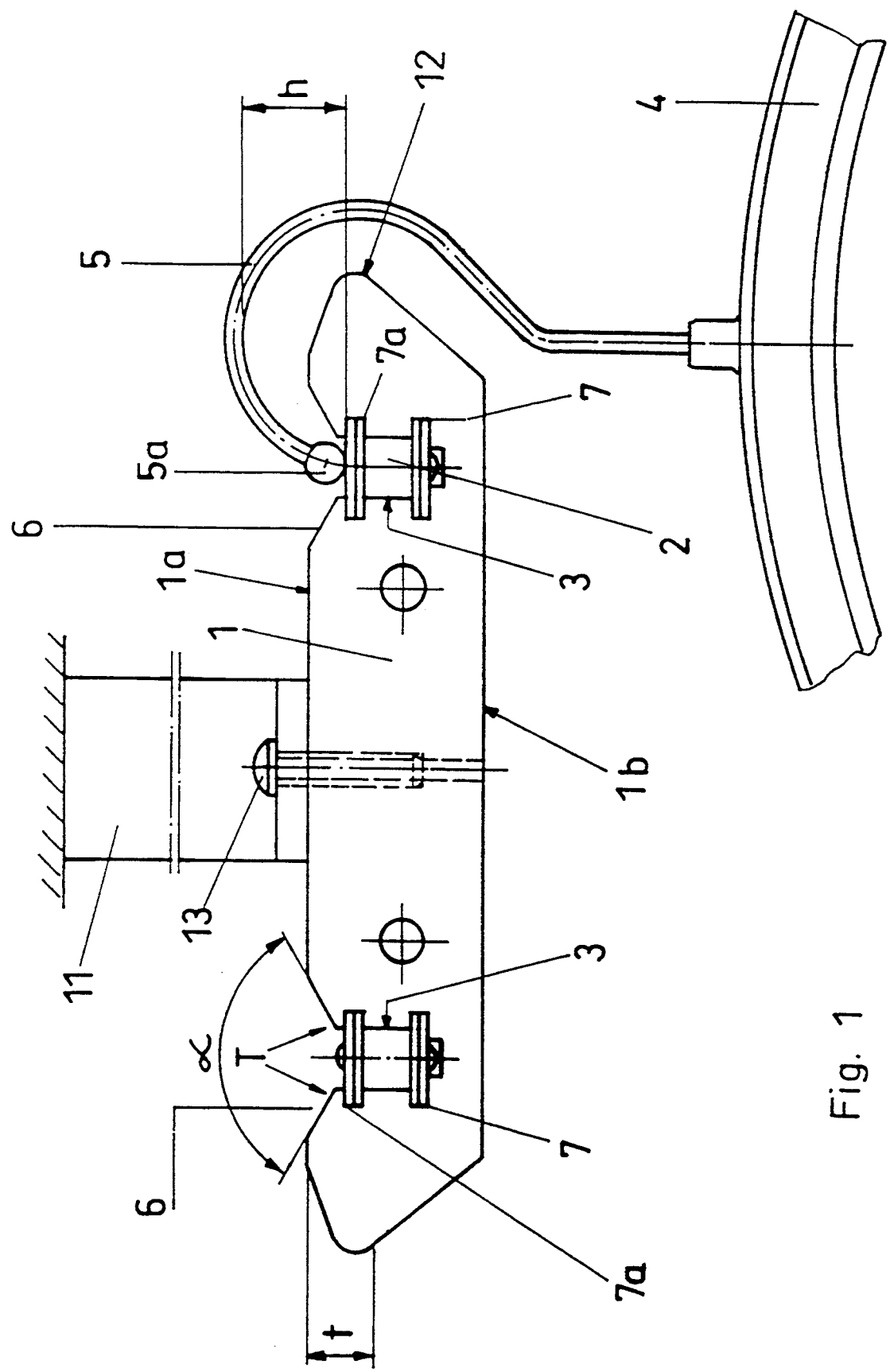
FIG. 1 is a cross-section having the profile of a rail according to an embodiment of the invention.

FIG. 1 shows the profile of the rail 1 in cross-section. Two chain channels 3 are formed in the profile extending in the longitudinal direction, parallel to each other, each having two horizontally extending grooves 7, 7a. The dimensions of the chain channels 3 and of the grooves 7, 7a are selected so that an ordinary roller chain 2 can be guided directly therein. The rail 1 is preferably formed of plastic so as to assure quiet travel of the endless roller chain 2.

Toward the top of the rail 1, each chain channel 3 widens conically outward to form a conical groove 6, so that a V-shaped bevel is obtained which is directed downward, in the direction toward the roller chain 2 inserted into the chain channel 3. The cone angle $\alpha$ of the conical groove 6 is preferably 120°. The groove has a depth t which will depend on the type of the hanger hooks 5 that are to be transported. The depth t is, in any event, less than the height h between the tip 5a of the hanger hook and the top inner side of the hanger hook 5 of the hanger 4, so that the hanger hook 5 which rests by means of its tip 5a on the roller chain 2 does not come directly against the rail 1.

The conical groove 6 provides assurance, on the one hand, that the hanger hook 5 can slide in a defined position on the roller chain 2 regardless of how it has been introduced; and on the other hand, it prevents the hanger hooks 5 from sliding out of the conveyor path at the transition point T, between the conical or V-shaped part and the rectanguar part, of the chain channel 3.

In order to assure the freest possible passage of the hanger hook 5, the rail 5 is of trapezoidal shape in profile, its bottom 1b being narrower than the top side 1a facing the hanger hook 5. The chain channels 3 lie far enough toward the center of the rail 1 that the side edge 12 can perform both a guiding and a supporting function for hangers 4 which are not precisely perpendicular to the direction of transport, and can receive their hanger hooks 5 so as to prevent jamming of individual hangers 4 during transport. In other words, only a limited turning of the hanger hook is permitted as a result of the relative positions of the chain channel 3 and side edge 12.

The conveyor provided with this rail 1 can be either linear or curved or both. In particular, due to its compact measurements, even small curve radii can be provided, so that the rail can serve as a transfer conveyor between two cable conveyors SF1, SF2 which are arranged at an angle to each other.

FIG. 2 is a diagrammatic top view of a transfer conveyor provided with the rail 1 for transferring hangers from a cable conveyor SF1 to a cable conveyor SF2. The drive motor 9, which is arranged above the rail 1, engages via a gear wheel (not shown in detail) into a recess 10 in the rail 1, thereby driving the roller chain 2. The roller chain 2 is tensioned in a simple manner by a tension spring 8, one end of which is fastened to the top 1a of the rail 1, while its other end acts on the drive gear of the drive motor 9. The rail 1 is preferably suspended from the ceiling of the room by a plurality of suspension devices 11 fastened to it by means of screws 13.

The cable conveyors SF1 and SF2 are arranged at an angle to each other. The rail 1 is either developed as a single piece or else it is composed of individual segments, not shown here. It need not be explained in detail that individual segments can be used, individually or in combination, to afford the advantage of bridging over any angular offset of the cable conveyors SF1, SF2, by keeping a suitable supply of segments in stock. Via connecting pieces 17, 18, the rail 1 is connected on both sides with the cable conveyors SF1, SF2. The roller chain 2 is shown in dot-dash line in the figure. It can be noted that, by laterally offsetting the transition pieces 14, 15 with respect to the conveyor line 16, a linear transfer from the cable conveyor SF1 to the rail 1, and from there to the cable conveyor SF2, is possible.

The rail 1 can be relatively narrow, so it will take up the least possible space. The width of the rail 1 is, in the final analysis, determined only by the space which is occupied by the roller chain 2. In turn, the minimum radius of the curved transport path is also determined by the size of the links of the roller chain 2 within the rail.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A rail for a conveyor for transporting goods hanging on hangers, the conveyor comprising pulling means which travels in the rail with the tips of the hanger hooks supported on the pulling means, the rail comprising:

a channel formed in the rail, the pulling means being a roller chain, the roller chain having a cross-sectional shape matching that of the channel and thereby being guided directly by inwardly facing surfaces of the channel;

the channel being recessed with respect to an upward-facing surface of the rail which faces the hanger hooks, the channel opening upward toward the exterior of the rail to form a generally V-shaped or conically opening groove;

the rail having a cross-section which is at least approximately trapezoidal and thereby is broader toward a top of the trapezoid than at the bottom thereof.

2. A rail according to claim 1, wherein the V-shaped or conically opening groove has an upwardly directed angle of opening ($\alpha$) of about 120°.

3. A rail for accommodating and guiding a roller chain for transporting goods hanging on hangers, and permitting the hangers to be supported by their tips on the roller chain, the rail comprising:

a channel formed in the rail, the channel having a cross-sectional shape substantially matching that of the roller chain to be accommodated, and for guiding such roller chain by direct contact with inwardly facing surfaces of the channel;

the channel being recessed below an upward-facing surface of the rail which faces the hanger hooks, the channel opening upward toward the exterior of the rail to form a groove which widens outwardly, thereby guiding the hanger hooks toward said conveyor;

the rail having a cross-section which is broader toward a top of the rail than toward the bottom thereof, thereby guiding the hanger hooks to be oriented substantially transverse with respect to the rail.

4. A rail for accommodating and guiding a conveyor for transporting goods hanging on hangers, and permitting the hangers to be supported by their tips on the conveyor, the rail comprising:

a channel formed in the rail, the conveyor having a cross-sectional shape substantially matching that of the channel and being guided by direct contact with inwardly facing surfaces of the channel;

the channel being recessed below an upward-facing surface of the rail which faces the hanger hooks, the channel opening upward toward the exterior of the rail to form a groove which widens outwardly, thereby guiding the hanger hooks toward said conveyor;

the rail having a cross-section which is broader toward a top of the rail than toward the bottom thereof, thereby guiding the hanger hooks to be oriented substantially transverse with respect to the rail, wherein the groove has an upwardly directed angle of opening ($\alpha$) of about 120°.

5. In combination, a conveyor for transporting goods hanging on hangers and a rail for accommodating and guiding the conveyor, and permitting the hangers to be supported by their tips on the conveyor, the combination comprising:

(A) a roller chain conveyor; and
(B) the rail comprising:
  a channel formed in the rail in the rail, the roller chain conveyor having a cross-sectional shape substantially matching that of the channel, and being accommodated in said channel and guided by direct contact with inwardly facing surfaces of the channel;
  the channel being recessed below an upward-facing surface of the rail which faces the hanger hooks, the channel opening upward toward the exterior of the rail to form a groove which widens outwardly, thereby guiding the hanger hooks toward said conveyor;
  the rail having a cross-section which is broader toward a top of the rail than toward the bottom thereof, thereby guiding the hanger hooks to be oriented substantially transverse with respect to the rail.

* * * * *